United States Patent [19]
Kito et al.

[11] Patent Number: 6,132,162
[45] Date of Patent: Oct. 17, 2000

[54] STORAGE CONSTRUCTION FOR SPARE TIRE OF MOTOR VEHICLE

[75] Inventors: Yasuo Kito; Yukihiro Shibata, both of Anjo; Masanobu Hanazaki; Kei Ikeda, both of Hiroshima-ken, all of Japan

[73] Assignees: Mannoh Kogoy Co., Ltd., Aichi; Mazda Motor Corporation, Hiroshima, both of Japan

[21] Appl. No.: 09/453,446

[22] Filed: Dec. 3, 1999

[30] Foreign Application Priority Data

Dec. 28, 1998 [JP] Japan .................................. 10-373945

[51] Int. Cl.⁷ .................................................. B62D 43/04
[52] U.S. Cl. ............................................ 414/463; 254/323
[58] Field of Search .................................... 254/323, 342, 254/375; 414/463, 466

[56] References Cited

U.S. PATENT DOCUMENTS

| | | | |
|---|---|---|---|
| 4,498,835 | 2/1985 | Yasue et al. | 414/463 |
| 4,915,358 | 4/1990 | Stallings | 254/323 |
| 4,997,164 | 3/1991 | Kito et al. | 414/463 X |
| 5,314,288 | 5/1994 | Schmidt | 414/463 |

FOREIGN PATENT DOCUMENTS 1 020 539  12/1957  Germany ................. 414/463

62-268779  11/1987  Japan .

*Primary Examiner*—Janice L. Krizek
*Attorney, Agent, or Firm*—Nixon Peabody LLP; Donald R. Studebaker

[57] ABSTRACT

A storage construction in which a spare tire of a motor vehicle is stored, comprising: a tire storage portion for storing the spare tire, which is disposed under a floor panel of the motor vehicle; a hoisting cable at one end of which a hanger engageable with a hub hole of the spare tire is provided; a hoist around which the other end of the hoisting cable is wound and which lifts the spare tire by winding the hoisting cable so as to store the spare tire in the tire storage portion and lowers the spare tire from the tire storage portion by unwinding the hoisting cable; an operating handle which is detachably inserted into an insertion portion of the hoist from a cabin of the motor vehicle such that winding and unwinding of the hoisting cable by the hoist are performed by operating the operating handle; a detachment preventing device which prevents detachment of the operating handle from the hoist before the spare tire is lifted to a hoisting completion position by the hoist; and a contact member which is secured to the hoisting cable and is brought into contact, when the spare tire has been lifted to the hoisting completion position by the hoist, with the detachment preventing device so as to set the detachment preventing device to an inoperative state such that the operating handle can be detached from the hoist.

8 Claims, 9 Drawing Sheets

STORAGE CONSTRUCTION FOR SPARE TIRE OF MOTOR VEHICLE

BACKGROUND OF THE INVENTION 1. (Field of the Invention)

The present invention generally relates to improvement of a storage construction in which a spare tire of a motor vehicle is stored in a tire storage portion disposed under a floor panel of the motor vehicle and more particularly, to countermeasures for preventing defective storage, accidental detachment, etc. of the spare tire.

2. (Description of the Prior Art)

A motor vehicle in which a spare tire is stored is known from, for example, Japanese Patent Laid-Open Publication No. 62-268779 (1987). In this known motor vehicle, its passenger initially gets out of the motor vehicle and engages in a hub hole of the spare tire a hanger provided at a distal end of a hoisting cable. In this state, the passenger inserts an operating handle into an insertion portion of a hoist and rotates the operating handle so as to actuate the hoist such that the hoisting cable is wound. As a result, the spare tire is lifted to a lower portion of a vehicle body so as to be stored in an oblique attitude.

On the other hand, an arrangement has been proposed in which a tire storage portion for storing a spare tire is provided between wheels and under a floor panel of a motor vehicle in order to effectively use space of the motor vehicle.

Meanwhile, in case the conventional hoist having the hoisting cable in the above mentioned publication is employed in the above known arrangement, it is difficult to operate the operating handle because the tire storage portion is provided under the floor panel. Therefore, it is desirable that the operating handle can be operated in a cabin. In order to store the spare tire in the tire storage portion in this case, the passenger initially gets out of the motor vehicle and engages in the hub hole of the spare tire the hanger provided at the distal end of the hoisting cable. Then, the passenger returns to the cabin and rotates the operating handle. However, at this time, such a phenomenon may happen that the spare tire is placed on the ground without being stored in the tire storage portion due to the passenger's failure to operate the operating handle. If the passenger starts running of the motor vehicle without noticing this dangerous state, such a serious problem arises that the motor vehicle runs while dragging the spare tire on the ground.

Generally, a temporary tire should be stored in the tire storage portion as the spare tire. Therefore, a standard tire having a width larger than that of the temporary tire should not be stored in the tire storage portion as the spare tire. Nevertheless, if the standard tire is erroneously stored in the tire storage portion as the spare tire, such a risk is incurred that the stored standard tire comes quite close to the ground due to its larger width than that of the temporary tire. Meanwhile, if an outside and an inside of the temporary tire to be stored in the tire storage portion as the spare tire are inadvertently oriented reversely, disposition of the spare tire in the tire storage portion is different from that of the properly stored spare tire and thus, storage of the spare tire becomes unstable.

Moreover, in the above known arrangement in which the spare tire is hung from the tire storage portion provided under the floor panel of the motor vehicle, it is necessary to take a countermeasure for preventing accidental detachment of the spare tire from the tire storage portion.

SUMMARY OF THE INVENTION

Accordingly, an essential object of the present invention is to provide a storage construction which positively eliminates the above mentioned drawbacks of prior art storage constructions such as a passenger's failure to hoist a spare tire, the passenger's inadvertent reverse orientation of an outside and an inside of a temporary tire to be stored as the spare tire, the passenger's erroneous storage of a standard tire as the spare tire and accidental detachment of the spare tire from a tire storage portion.

In order to accomplish this object of the present invention, the storage construction of the present invention is characterized in that in case the passenger fails to hoist the spare tire, inadvertently orients reversely the outside and the inside of the temporary tire to be stored as the spare tire or erroneously stores the standard tire as the spare tire, an operating handle cannot be detached from an insertion portion of a hoist and that the stored spare tire is securely held in the tire storage portion so as not to be detached from the tire storage portion.

To this end, a storage construction in which a spare tire of a motor vehicle is stored, according the present invention comprises: a tire storage portion for storing the spare tire, which is disposed under a floor panel of the motor vehicle; a hoisting cable at one end of which a hanger engageable with a hub hole of the spare tire is provided; a hoist around which the other end of the hoisting cable is wound and which lifts the spare tire by winding the hoisting cable so as to store the spare tire in the tire storage portion and lowers the spare tire from the tire storage portion by rewinding the hoisting cable; an operating handle which is detachably inserted into an insertion portion of the hoist from a cabin of the motor vehicle such that winding and rewinding of the hoisting cable by the hoist are performed by operating the operating handle; a detachment preventing device which prevents detachment of the operating handle from the hoist before the spare tire is lifted to a hoisting completion position by the hoist; and a contact member which is secured to the hoisting cable and is brought into contact, when the spare tire has been lifted to the hoisting completion position by the hoist, with the detachment preventing device so as to set the detachment preventing device to an inoperative state such that the operating handle can be detached from the hoist.

In accordance with the present invention, until the spare tire is lifted to the hoisting completion position by the hoist, the detachment preventing device for preventing detachment of the operating handle from the hoist is set to an operative state and thus, the operating handle cannot be detached from the hoist. Therefore, by confirming this operative state of the detachment preventing device, the passenger's failure to hoist the spare tire can be eliminated positively and thus, such a risk can be eliminated that the motor vehicle runs while dragging the spare tire on the ground.

Meanwhile, in accordance with the present invention, in case the passenger inadvertently orients reversely an outside and inside of a temporary tire to be stored as the spare tire or erroneously stores a standard tire as the spare tire, the hanger is not carried to an upper stroke end due to geometrical difference between the defectively stored spare tire and the properly stored spare tire, so that the detachment preventing device for preventing detachment of the operating handle from the hoist is kept in the operative state and thus, the operating handle cannot be detached from the hoist in the same manner as described above. Therefore, the passenger can judge from this operative state of the detachment preventing device that storage of the spare tire is defective and thus, can avoid such a risk that the passenger drives the motor vehicle in the defective storage state of the spare tire.

BRIEF DESCRIPTION OF THE DRAWINGS

This object and features of the present invention will become apparent from the following description taken in conjunction with the preferred embodiment thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1:
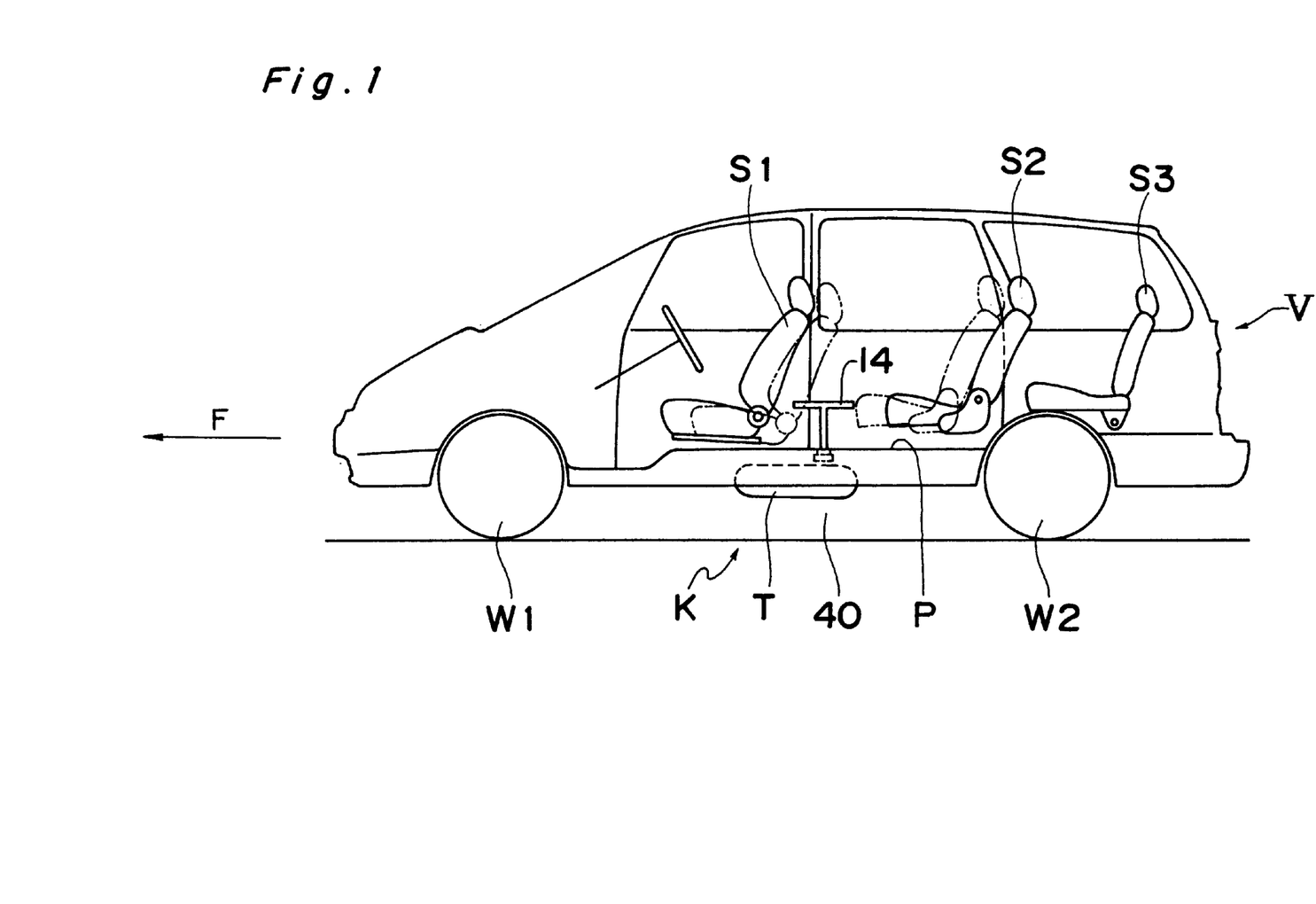
FIG. 1 is a schematic partially cutaway side elevational view of a motor vehicle employing a storage construction according to one embodiment of the present invention.
Figure 2:
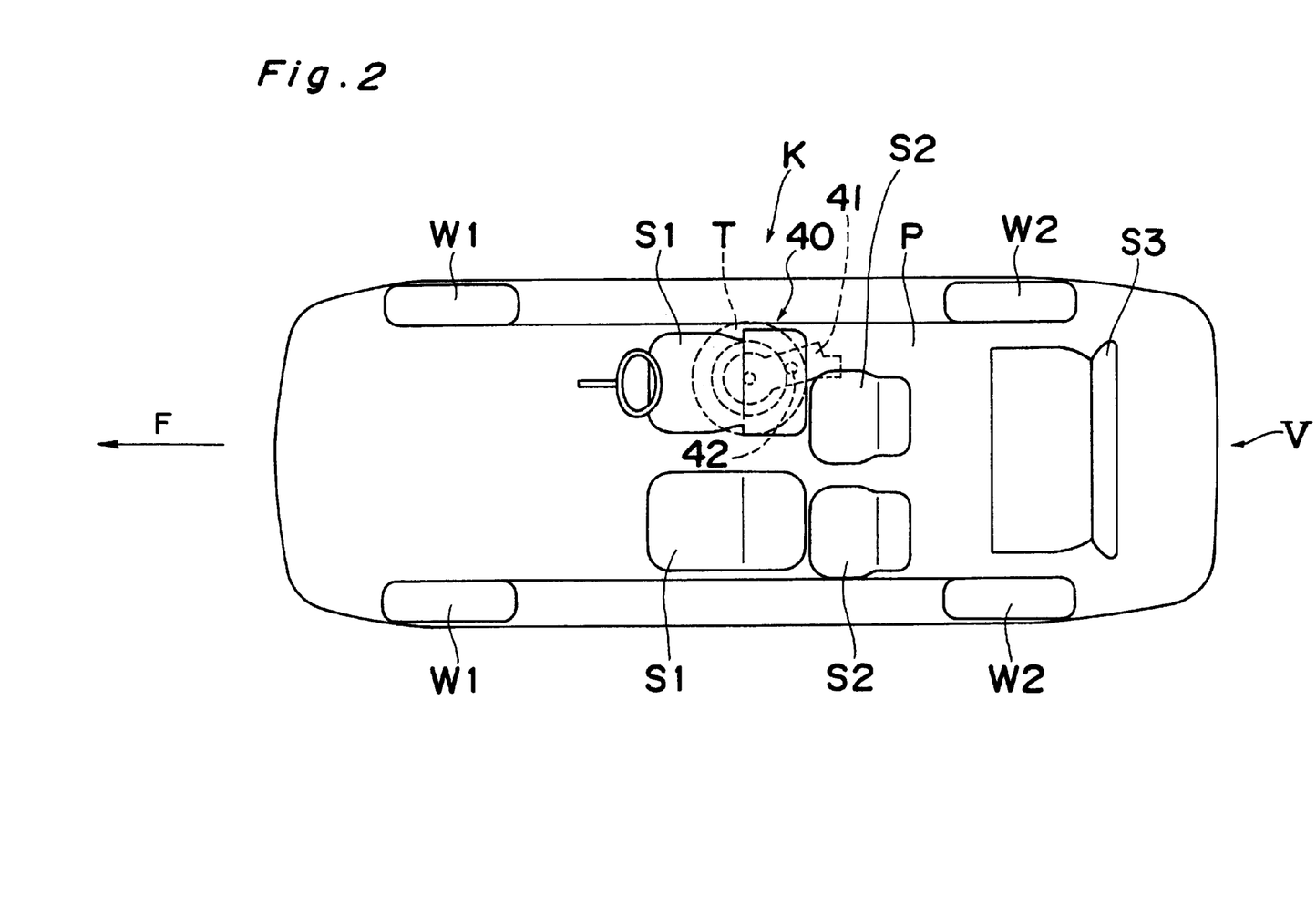
FIG. 2 is a schematic cutaway top plan view of the motor vehicle of FIG. 1.

Hereinafter, one embodiment of the present invention is described with reference to the drawings. FIGS. 1 and 2 show a motor vehicle V employing a storage construction K in which a spare tire T of the motor vehicle V is stored, according to the one embodiment of the present invention. In FIGS. 1 and 2, the arrow F illustrates a forward running direction of the motor vehicle V. The motor vehicle V includes a pair of front wheels W1 and a pair of rear wheels W2, which are provided at opposite sides of the motor vehicle V. The motor vehicle V further includes a floor panel P, a pair of front seats S1, a pair of middle seats S2 and a rear seat S3. The storage construction K is provided between the front wheels W1 and the rear wheels W2 and under the floor panel P and is disposed at a location interposed between the right front seat S1 and the right middle seat S2 when viewed from a cabin of the motor vehicle V in FIG. 2. The storage construction K includes a tire storage portion 40 for storing the spare tire T of the motor vehicle V, which is provided under the floor panel P.

Figure 3:
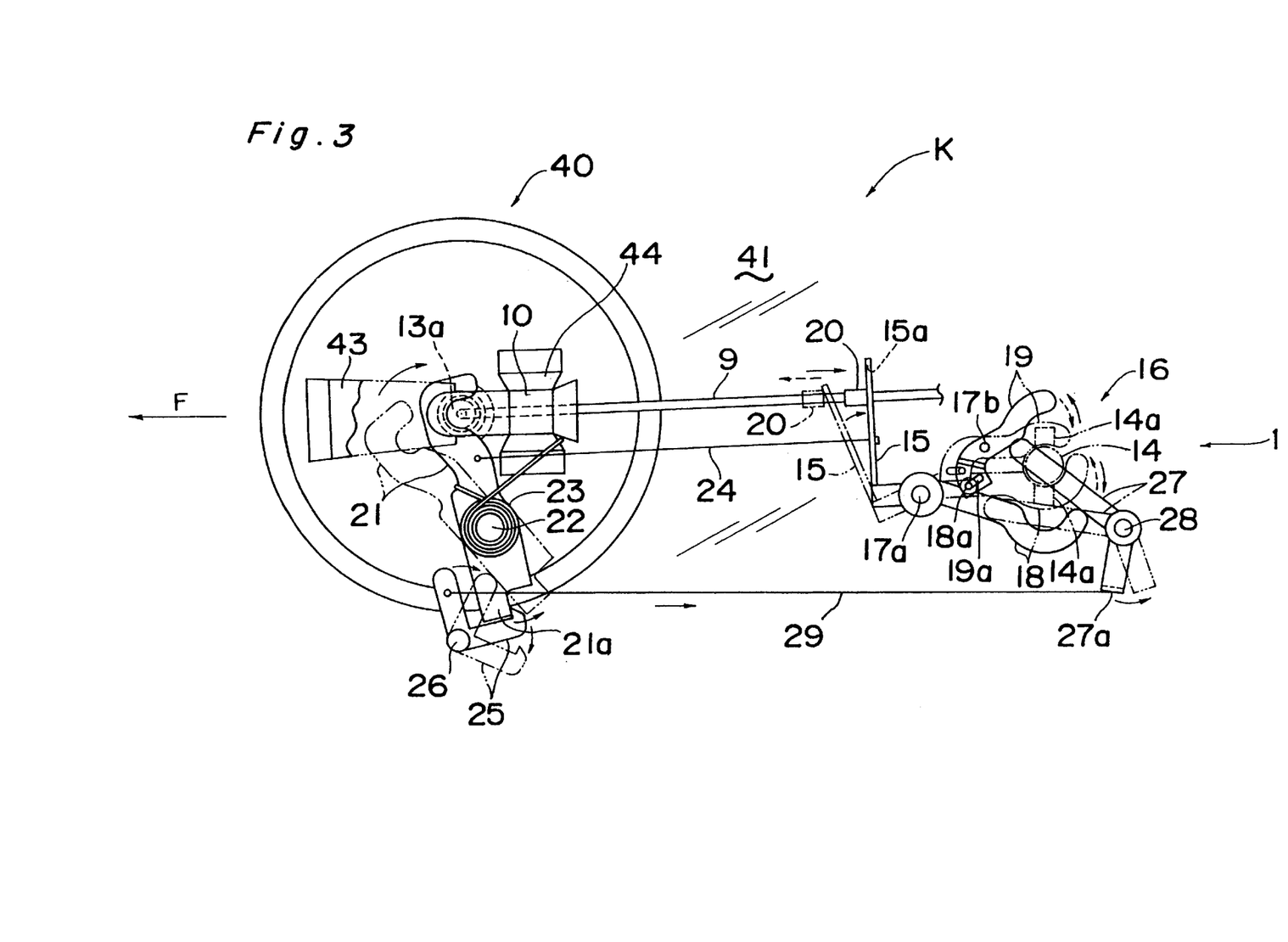
FIG. 3 is a schematic top plan view of the storage construction of FIG. 1.
Figure 4:
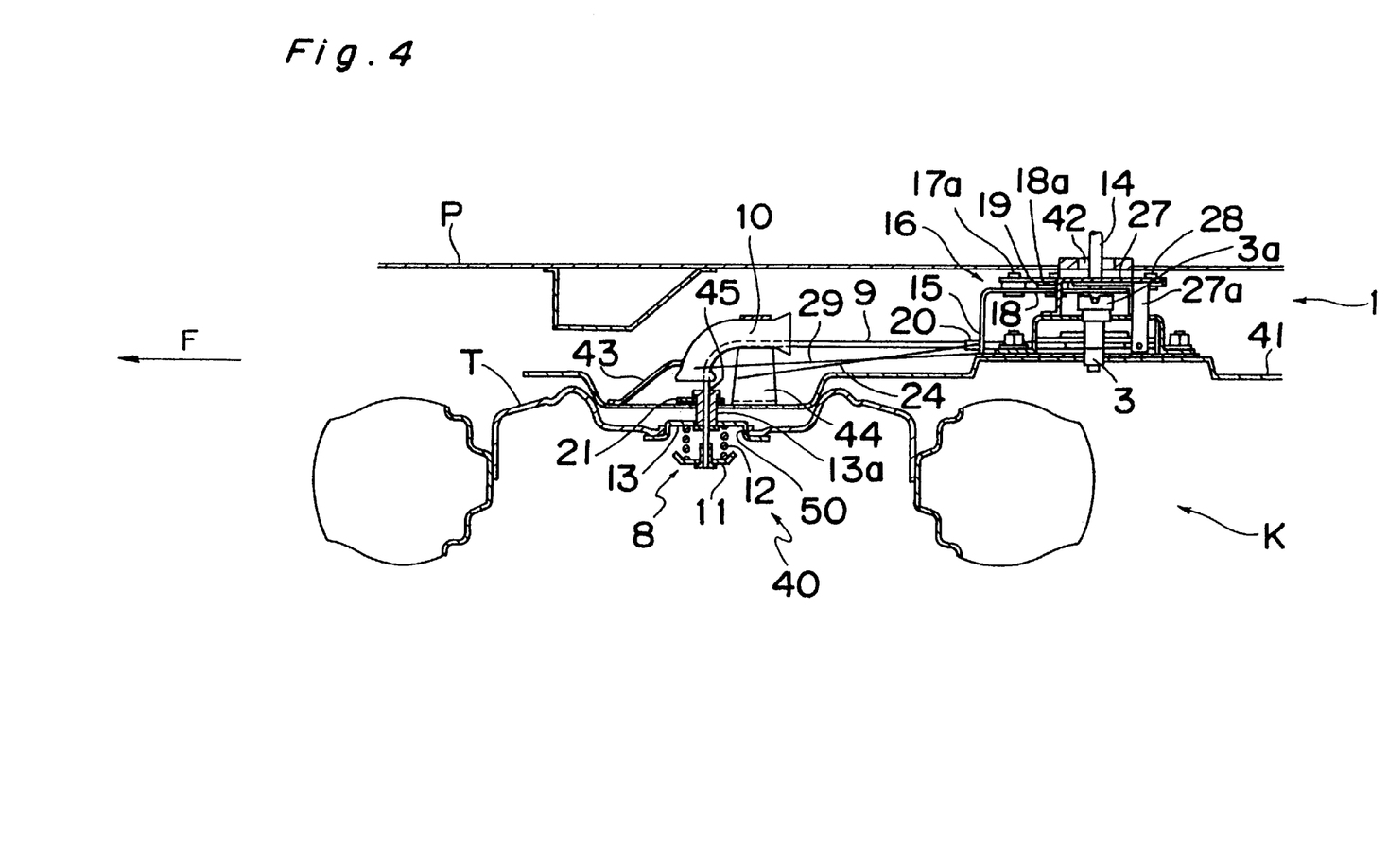
FIG. 4 is a schematic vertical sectional view of the storage construction of FIG. 1.

As shown in FIGS. 3 and 4, the storage construction K includes a hoist 1 and a support plate 41 which is provided under the floor panel P so as to be spaced a certain distance from the floor panel P. The hoist 1 is provided at one end portion of the support plate 41, while the tire storage portion 40 referred to above is provided at the other end portion of the support plate 41. An operating hole 42 is formed at a portion of the floor panel P, which is disposed immediately above the hoist 1.

Figure 7:
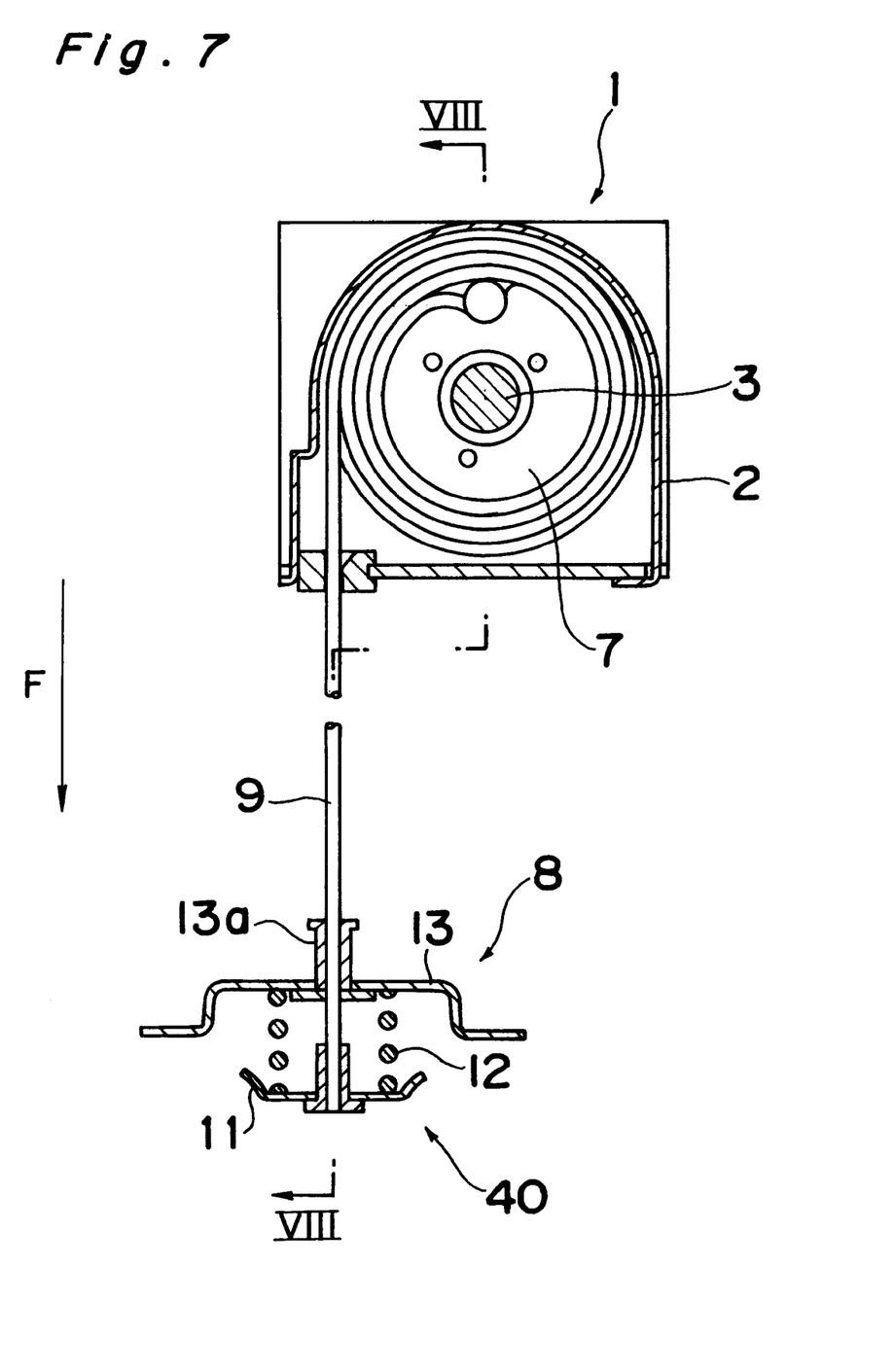
FIG. 7 is a schematic horizontal sectional view of the storage construction of FIG. 1.
Figure 8:
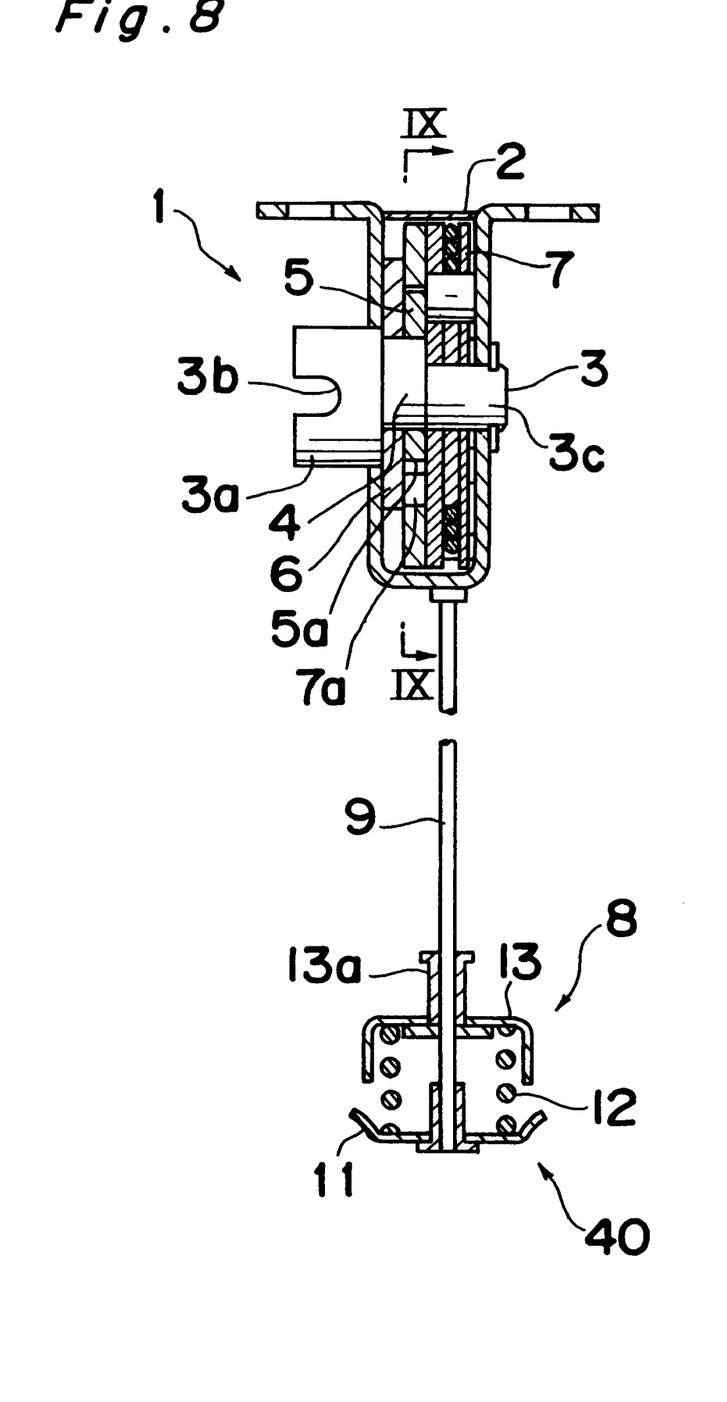
FIG. 8 is a sectional view taken along the line VIII—VIII in FIG. 7.
Figure 9:
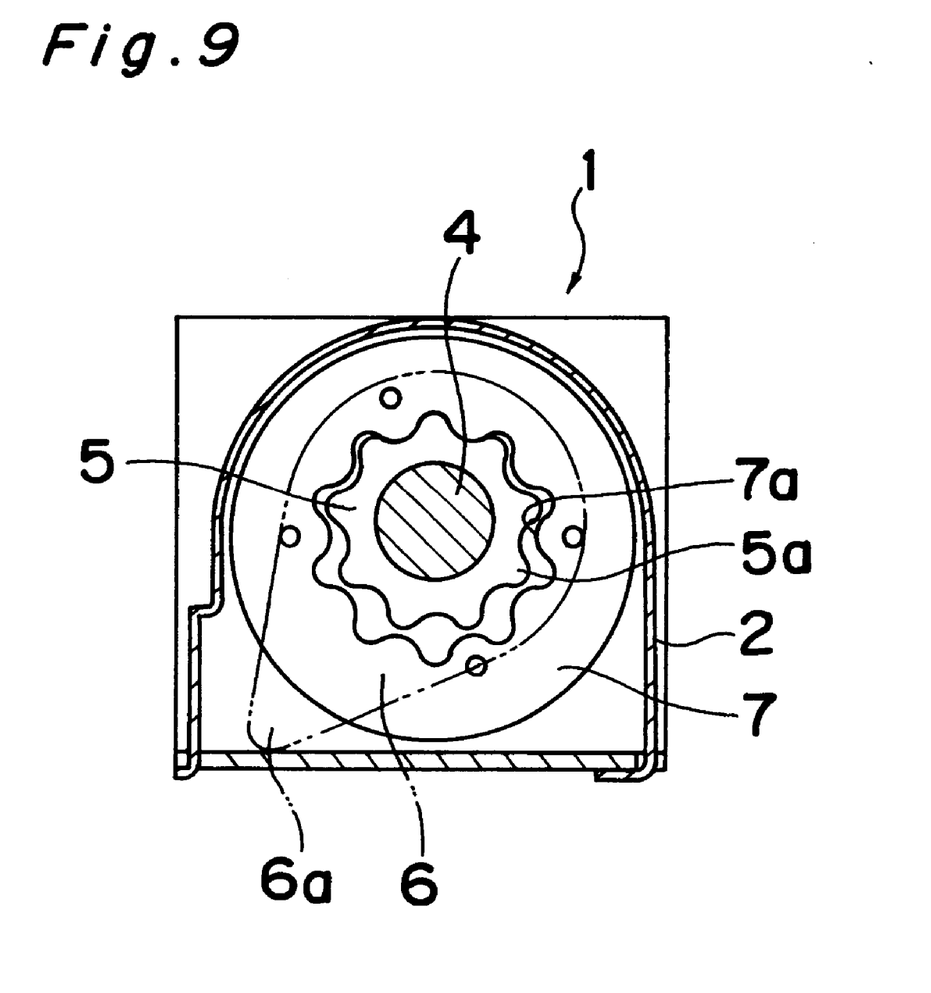
FIG. 9 is a sectional view taken along the line IX—IX in FIG. 8.

As shown in FIGS. 7 to 9, particularly in FIG. 8, the hoist 1 includes a drive shaft 3 extending through a casing 2. As shown in FIG. 8, an insertion portion 3a formed, at a periphery of its end face, with an engageable slot 3b and a small-diameter portion 3c are, respectively, provided at opposite end portions of the drive shaft 3, while an eccentric cam 4 is provided between the insertion portion 3a and the small-diameter portion 3c such that the eccentric cam 4 and a major part of the small-diameter portion 3c are disposed in the casing 2. A drive gear 5 having a plurality of teeth 5a formed on its outer periphery is supported by a gear plate 6 and is mounted on the eccentric cam 4. A winding wheel 7 having a plurality of teeth 7a formed on its inner periphery is mounted on the small-diameter portion 3c such that the drive gear 5 is surrounded by the teeth 7a of the winding wheel 7. One end of a hoisting cable 9 is attached to a hanger 8, while the other end of the hoisting cable 9 is wound around the winding wheel 7. Upon rotation of the drive shaft 3, the drive gear 5 is rotated simultaneously with displacement of a rotational center of the drive gear 5 such that the teeth 5a of the drive gear 5 are brought into or out of mesh with the teeth 7a of the winding wheel 7. A bulge portion 6a is formed at one end of the gear plate 6 and restrains, during winding and rewinding operations of the hoisting cable 9 of the hoist 1, reverse operations of the hoisting cable 9 through contact of the bulge portion 6a with an inner face of the casing 2 so as to prevent slack of the hoisting cable 9. As a result, the hoisting cable 9 is wound around or unwound from the winding wheel 7 without fluctuations of a winding position and an unwinding position of the hoisting cable 9.

Figure 5:
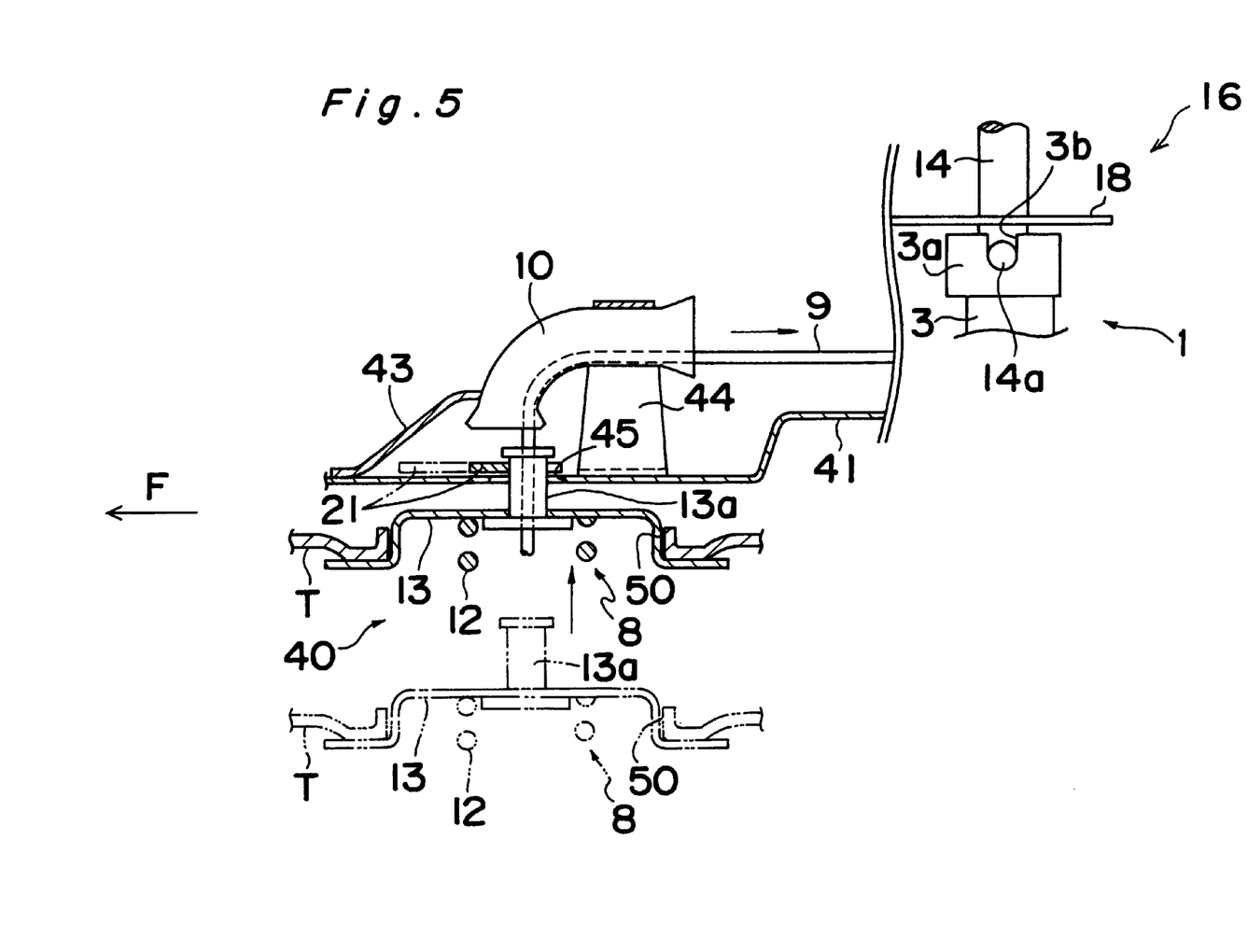
FIG. 5 is a schematic partially vertical sectional and broken view of the storage construction of FIG. 1, particularly showing a detachment preventing device for preventing detachment of an operating handle from an insertion portion of a hoist and a mechanism for preventing detachment of a spare tire from a tire storage portion.
Figure 6:
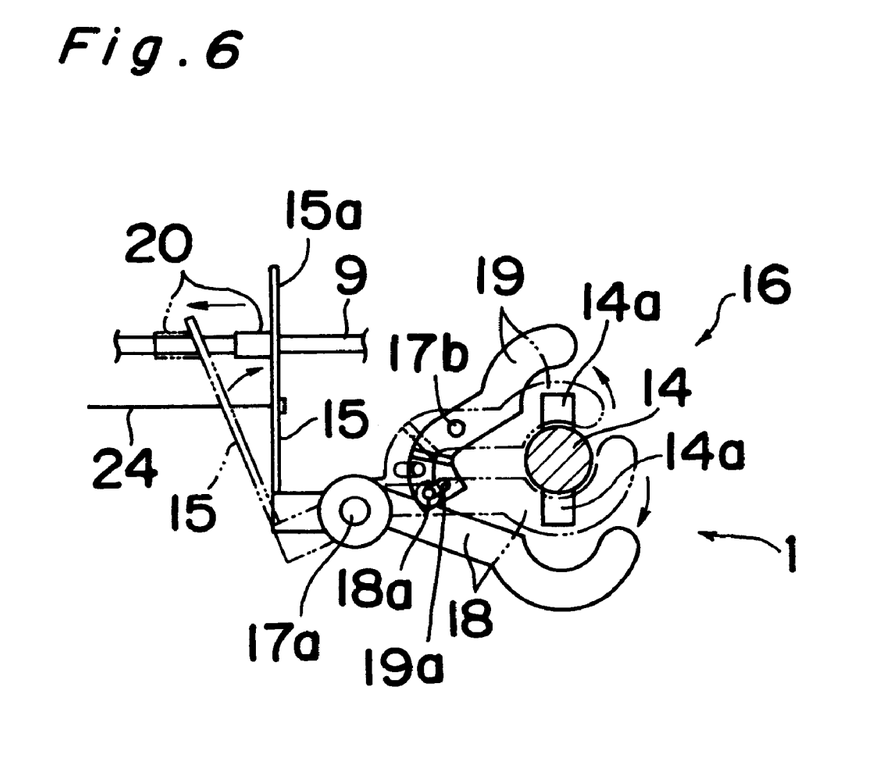
FIG. 6 is a schematic top plan view of the detachment preventing device of FIG. 5.

As shown in FIGS. 4 to 6, a tubular guide 10 is mounted on an upper face of the support plate 41 at a central portion of the tire storage portion 40 by brackets 43 and 44 so as to confront the floor panel P. One end portion of the hoisting cable 9 is inserted through the tubular guide 10 and is hung downwardly in the tire storage portion 40 via a hole 45 of the support plate 41. It is needless to say that the above mentioned hanger 8 is also disposed at a lower portion of the tire storage portion 40. The hanger 8 includes a circular plate 11 to which the one end of the hoisting cable 9 is attached and a rectangular plate 13 which is disposed above the circular plate 11 through a coiled spring 12. The rectangular plate 13 is arranged to be brought into engagement with a hub hole 50 of the spare tire T from below as follows. Namely, after the hanger 8 has been inserted into the hub hole 50 of the spare tire T from above by slanting the hanger 8 as a whole, the rectangular plate 13 is brought into engagement with a peripheral edge of the hub hole 50 of the spare tire T from below. Meanwhile, an upwardly extending tubular projection 13a is integrally formed at a central portion of the rectangular plate 13. The one end of the hoisting cable 9 is inserted through the tubular projection 13a so as to be attached to a center of the circular plate 11.

As shown in FIGS. 4 to 6, a distal end of an operating handle 14 is detachably inserted into the insertion portion 3a of the drive shaft 3 via the operating hole 42 of the floor panel P from the cabin of the motor vehicle V. An engageable pin 14a extending radially outwardly from the distal end of the operating handle 14 is brought into engagement with the engageable slot 3b of the insertion portion 3a so as to transmit rotational force to the drive shaft 3 upon operation of the operating handle 14 such that the hoisting cable 9 is wound and unwound by the hoist 1. Thus, when the hoisting cable 9 is wound by the hoist 1, the spare tire T is lifted so as to be stored in the tire storage portion 40. On the other hand, when the hoisting cable 9 is unwound by the hoist 1, the spare tire T is lowered from the tire storage portion 40 to the ground.

As shown in FIGS. 3 to 6, a detachment preventing device 16 for preventing detachment of the operating handle 14 from the insertion portion 3a of the drive shaft 3 is provided in the hoist 1. The detachment preventing device 16 is constituted by a first claw member 18 whose one end is pivotal about a first shaft 17a and a second claw member 19 whose one end is pivotal about a second shaft 17b. The first and second claw members 18 and 19 are, respectively, attached by the first and second shafts 17a and 17b to a periphery of the operating hole 42, i.e., a periphery of the insertion portion 3a of the drive shaft 3 under the floor panel P. The first claw member 18 has an engageable boss 18a and is urged at all times towards the second claw member 19 by elastic force of a spring (not shown). An elongated opening 19a is formed at a base end portion of the second claw member 19. The engageable boss 18a of the first claw member 18 is held in engagement with the elongated opening 19a of the second claw member 19 so as to be displaced in response to pivotal movement of the first claw member 18 such that the second claw member 19 is moved towards and away from the first claw member 18 by sliding resistance of the second claw member 19 due to displacement of the engageable boss 18a.

An opening lever 15 is integrally formed at a base end of the first claw member 18 and an elongated opening 15a for passing the hoisting cable 9 therethrough is formed at a distal end portion of the opening lever 15. On the other hand, a contact member 20 is secured to the hoisting cable 9. When the spare tire T has been lifted to a hoisting completion position through winding of the hoisting cable 9, the contact member 20 is brought into contact with the opening lever 15 so as to open the first and second claw members 18 and 19 such that operating handle 14 can be detached from the hoist 1.

More specifically, when the contact member 20 is brought into contact with the opening lever 15 through winding of the hoisting cable 9 so as to depress the opening lever 15 from a state of the imaginary line in FIGS. 3 and 6 to a state of the solid line in FIGS. 3 and 6 by using the first shaft 17a as a pivotal axis, the first claw member 18 is pivoted clockwise in FIGS. 3 and 6 about the first shaft 17a so as to displace the engageable boss 18a along the elongated opening 19a of the second claw member 19 such that the second claw member 19 is pivoted counterclockwise in FIGS. 3 and 6 about the second shaft 17b by sliding resistance of the second claw member 19 due to this displacement of the engageable boss 18a. As a result, the first and second claw members 18 and 19 are opened so as to be moved away from each other from a state of the imaginary line in FIGS. 3 and 6 to a state of the solid line in FIGS. 3 and 6. On the contrary, when the contact member 20 is held out of contact with the opening lever 15 as shown by the imaginary line in FIGS. 3 and 6, the first claw member 18 is pivoted counterclockwise in FIGS. 3 and 6 about the first shaft 17a by elastic force of the spring (not shown) so as to displace the engageable boss 18a along the elongated opening 19a in a direction opposite to that of the above mentioned case such that the second claw member 19 is pivoted clockwise in FIGS. 3 and 6 about the second shaft 17b by sliding resistance of the second claw member 19 due to this displacement of the engageable boss 18a. As a result, the first and second claw members 18 and 19 are closed so as to come close to each other from the state of the solid line in FIGS. 3 and 6 to the state of the imaginary line in FIGS. 3 and 6. Namely, the second claw member 19 is pivoted in response to pivotal movement of the first claw member 18 in the direction opposite to that of pivotal movement of the first claw member 18 such that the first and second claw members 18 and 19 are opened and closed. If the operating handle 14 is pulled upwardly in an open state of the first and second claw members 18 and 19 when the engageable pin 14a of the operating handle 14 is held in engagement with the engageable slot 3b of the drive shaft 3 as shown in FIG. 5, the engageable pin 14a is brought out of contact with the first and second claw members 18 and 19 shown by the solid line in FIGS. 3 and 6 and thus, the operating handle 14 can be detached from the insertion portion 3a of the drive shaft 3. On the other hand, if the operating handle 14 is pulled upwardly in a closed state of the first and second claw members 18 and 19 when the engageable pin 14a of the operating handle 14 is held in engagement with the engageable slot 3b of the drive shaft 3 as shown in FIG. 5, the engageable pin 14a is brought into contact with the first and second claw members 18 and 19 shown by the imaginary line in FIGS. 3 and 6 and thus, the operating handle 14 cannot be detached from the insertion portion 3a of the drive shaft 3.

A hook 21 is pivotally provided in the vicinity of the tubular guide 10 so as to be pivoted about a shaft 22 and is urged at all times in a direction away from the hole 45 of the support plate 41 by elastic force of a spring 23. Meanwhile, a middle portion of the hook 21 is coupled with a middle portion of the opening lever 15 of the first claw member 18 by a wire 24. The hook 21 is pulled by the wire 24 in response to contact of the contact member 20 with the opening lever 15 so as to be detachably brought into engagement with the tubular projection 13a of the hanger 8. Therefore, when the spare tire T has been lifted to the hoisting completion position by the hoist 1, the hook 21 is brought into engagement with the tubular projection 13a of the hanger 8 so as to prevent detachment of the spare tire T from the tire storage portion 40.

A locking member 25 is pivotally provided adjacent to a base end portion 21a of the hook 21 so as to be pivoted about a shaft 26 and is urged at all times towards the base end portion 21a of the hook 21 by elastic force of a spring (not shown). The locking member 25 is detachably brought into engagement with the base end portion 21a of the hook 21 so as to lock engagement of the hook 21 with the tubular projection 13a of the hanger 8 such that the hook 21 is not detached from the tubular projection 13a of the hanger 8.

On the other hand, an operating lever 27 having a downwardly extending piece 27a is pivotally provided above the insertion portion 3a of the drive shaft 3 in the hoist 1 so as to be pivoted about a shaft 28 and is urged at all times by a spring (not shown) to assume a state of the solid line in FIG. 3. In an inoperative state of the operating lever 27, the operating lever 27 acts as a cover for covering the insertion portion 3a of the drive shaft 3. A lower end of the downwardly extending piece 27a of the operating lever 27 is coupled with a base end portion of the locking member 25 by a wire 29. Therefore, when the operating lever 27 is pivoted about the shaft 28 from the state of the solid line in FIG. 3 to a state of the imaginary line in FIG. 3, the locking member 25 is pulled by the wire 29 so as to be pivoted about the shaft 26 from a state of the solid line in FIG. 3 to a state of the imaginary line in FIG. 3 and is disengaged from the base end portion 21a of the hook 21 so as to unlock engagement of the hook 21 with the tubular projection 13a of the hanger 8 such that the hook 21 is detached from the tubular projection 13a of the hanger 8 by elastic force of the spring 23.

Hereinafter, procedures for storing the spare tire T in the tire storage portion 40 are described. A state is supposed here in which the hanger 8 is disposed at an upper stroke end of the tire storage portion 40 as shown by the solid line in FIG. 5 and the spare tire T is placed on the ground. In this state as shown by the solid line in FIG. 3, the contact member 20 of the hoisting cable 9 depresses the opening lever 15 of the first claw member 18 and the first and second claw members 18 and 19 of the detachment preventing device 16 are opened so as to be moved away from each other, so that the operating handle 14 can be inserted into the insertion portion 3a of the hoist 1. However, the operating lever 27 covers the insertion portion 3a of the hoist 1 as shown by the solid line in FIG. 3 so as to prevent insertion of the operating handle 14 into the insertion portion 3a of the hoist 1. Furthermore, the hook 21 is held in engagement with the tubular projection 13a of the hanger 8 as shown by the solid line in FIG. 3 and the locking member 25 is held in engagement with the base end portion 21a of the hook 21 as shown by the solid line in FIG. 3 so as to lock engagement of the hook 21 with the tubular projection 13a of the hanger 8.

Initially, a passenger of the motor vehicle V pivots the operating lever 27 from the state of the solid line in FIG. 3 to the state of the imaginary line in FIG. 3 such that the insertion portion 3a of the hoist 1 is open to the cabin of the motor vehicle V. Then, the passenger inserts the operating handle 14 into the insertion portion 3a of the hoist 1. Upon the above mentioned pivotal movement of the operating lever 27, the locking member 25 is pulled by the wire 29 so as to be pivoted from the state of the solid line in FIG. 3 to the state of the imaginary line in FIG. 3 such that locking of the hook 21 by the locking member 25 is cancelled. As a result, the hook 21 is pivoted from the state of the solid line in FIG. 3 to the state of the imaginary line in FIG. 3 by elastic force of the spring 23.

Subsequently, the passenger operates the operating handle 14 so as to unwind the hoisting cable 9 of the hoist 1 and brings the hoisting cable 9 into engagement with the hub hole 50 of the spare tire T placed on the ground. Upon this unwinding of the hoisting cable 9, the contact member 20 is moved away from the opening lever 15, so that the first and second claw members 18 and 19 are moved towards each other by elastic force of the spring (not shown) as shown by the imaginary line in FIG. 3 such that the operating handle 14 is prevented by the first and second claw members 18 and 19 from being detached from the insertion portion 3a of the hoist 1. When the passenger winds the hoisting cable 9 of the hoist 1 in this state, the hoisting cable 9 is wound so as to raise the hanger 8 to the upper stroke end of the tire storage portion 40 and a distal end of the tubular projection 13a of the hanger 8 is projected upwardly from the support plate 41 through the hole 45 of the support plate 41 from a state of the imaginary line in FIG. 5 to a state of the solid line in FIG. 5. As a result, the spare tire T is stored in the tire storage portion 40.

At the same time, the contact member 20 of the hoisting cable 9 is brought into contact with the opening lever 15 of the first claw member 18 so as to depress the opening lever 15. Therefore, the first and second claw members 18 and 19 are opened so as to be moved away from each other as shown by the solid line in FIGS. 3 and 6 such that the operating handle 14 can be detached from the insertion portion 3a of the hoist 1. In addition, the hook 21 is pulled by the wire 24 so as to be pivoted from the state of the imaginary line in FIG. 3 to the state of the solid line in FIG. 3 and thus, is brought into engagement with the tubular projection 13a of the hanger 8 so as to prevent detachment of the spare tire T from the tire storage portion 40.

Thereafter, the passenger pulls the operating handle 14 out of the insertion portion 3a of the hoist 1 and thus, storage of the spare tire T in the tire storage portion 40 has been completed. At the same time, elastic force of the spring (not shown) causes the operating lever 27 to return to its original position from the state of the imaginary line in FIG. 3 to the state of the solid line in FIG. 3. Upon this return of the operating lever 27 to the original position, the locking member 25 is pivoted from the state of the imaginary line in FIG. 3 to the state of the solid line in FIG. 3 by elastic force of the spring (not shown) so as to be brought into engagement with the base end portion 21a of the hook 21. As a result, the locking member 25 locks engagement of the hook 21 with the tubular projection 13a of the hander 8 such that the hook 21 is not disengaged from the tubular projection 13a of the hanger 8. Thus, a series of the procedures for storing the spare tire T in the tire storage portion 40 have been completed.

When the spare tire T is stored in the tire storage portion 40, the front seat S1 and the middle seat S2 are slid away from each other as shown by the solid line in FIG. 1 so as to facilitate the passenger's operation of the operating handle 14 in the cabin. Meanwhile, operation for lowering the spare tire T from the tire storage portion 40 to the ground is performed in the same manner as described above.

In the storage construction K, until the spare tire T is stored in the spare storage portion 40, the first and second claw members 18 and 19 are closed so as to prevent detachment of the operating handle 14 from the insertion portion 3a of the hoist 1 as described above. Therefore, since the passenger can judge, by confirming the closed state of the first and second claw members 18 and 19, that storage of the spare tire T in the tire storage portion 40 has not yet been completed, the passenger's failure to hoist the spare tire T placed on the ground can be eliminated positively and thus, such a risk can be eliminated that the motor vehicle V runs while dragging the spare tire T on the ground.

Meanwhile, in case the passenger inadvertently orients reversely an outside and an inside of a temporary tire to be stored as the spare tire T or erroneously stores a standard tire in the tire storage portion 40 as the spare tire T, the hanger 8 is not carried to the upper stroke end of the tire storage portion 40 due to geometrical difference between the defectively stored spare tire and the properly stored spare tire T, so that the contact member 20 is not brought into contact with the opening lever 15. Therefore, the first and second claw members 18 and 19 are kept closed and thus, the operating handle 14 cannot be detached from the insertion portion 3a of the hoist 1 due to contact of the engageable pin 14a of the operating handle 14 with the first and second claw members 18 and 19. By noticing this defective storage state of the spare tire, the passenger can judge that storage of the spare tire in the tire storage portion 40 is defective and thus, can avoid such a risk that the passenger drives the motor vehicle V in the defective storage state of the spare tire.

Furthermore, since the hook 21 is held in engagement with the tubular projection 13a of the hanger 8 in a state where the spare tire T is stored in the tire storage portion 40, the spare tire T can be stably stored in the tire storage portion 40 without being detached from the tire storage portion 40. Meanwhile, even if such an accident should happen in which the hoisting cable 9 is severed at its location deviating from the contact member 20 towards a distal end of the hoisting cable 9 in the state where the spare tire T is stored in the tire storage portion 40, the opening lever 15 is still depressed by the contact member 20, so that the hook 21 is still pulled by the wire 24 so as to be held in engagement with the tubular projection 13a of the hanger 8 and thus, such a risk can be avoided that the spare tire T is detached from the tire storage portion 40 concurrently with severance of the hoisting cable 9.

Moreover, when the passenger pulls the operating handle 14 out of the insertion portion 3a of the hoist 1 after storage of the spare tire T in the tire storage portion 40, the locking member 25 is brought into engagement with the base end portion 21a of the hook 21 so as to lock engagement of the hook 21 with the tubular projection 13a of the hanger 8. Therefore, the spare tire T can be stored in the tire storage portion 40 quite stably by positively preventing detachment of the spare tire T from the tire storage portion 40. Meanwhile, even if the wire 24 for actuating the hook 21 by pulling the hook 21 is severed, the locking member 25 locks engagement of the hook 21 with the tubular projection 13a of the hanger 8, so that the hook 21 is held in engagement with the tubular projection 13a of the hanger 8 and thus, storage of the spare tire T in the tire storage portion 40 can be stabilized.

As is clear from the foregoing description of the storage construction K of the present invention, when the spare tire has been lifted to the hoisting completion position by winding the hoisting cable through operation of the operating handle, the contact member is brought into contact with the detachment preventing device for preventing detachment of the operating handle from the hoist so as to set the detachment preventing device to an inoperative state such that the operating handle can be detached from the hoist. Therefore, by confirming this inoperative state of the detachment preventing device, it is possible to positively eliminate the passenger's failure to hoist the spare tire, the passenger's inadvertent reverse orientation of an outside and an inside of a temporary tire to be stored as the spare tire, the passenger's erroneous storage of a standard tire as the spare tire, etc.

Meanwhile, in accordance with the present invention, since the hook is brought into engagement with the hanger when the spare tire has been lifted to the hoisting completion position by the hoist, the spare tire can be stably stored in the tire storage portion by positively preventing detachment of the spare tire from the tire storage portion.

Furthermore, in accordance with the present invention, since the hook is positively held in engagement with the hanger by the locking member, it is possible to prevent detachment of the spare tire from the tire storage portion further reliably.

What is claimed is:

1. A storage construction in which a spare tire of a motor vehicle is stored, comprising:

a tire storage portion for storing the spare tire, which is disposed under a floor panel of the motor vehicle;

a hoisting cable at one end of which a hanger engageable with a hub hole of the spare tire is provided;

a hoist around which the other end of the hoisting cable is wound and which lifts the spare tire by winding the hoisting cable so as to store the spare tire in the tire storage portion and lowers the spare tire from the tire storage portion by unwinding the hoisting cable;

an operating handle which is detachably inserted into an insertion portion of the hoist from a cabin of the motor vehicle such that winding and unwinding of the hoisting cable by the hoist are performed by operating the operating handle;

a detachment preventing device which prevents detachment of the operating handle from the hoist before the spare tire is lifted to a hoisting completion position by the hoist; and a contact member which is secured to the hoisting cable and is brought into contact, when the spare tire has been lifted to the hoisting completion position by the hoist, with the detachment preventing device so as to set the detachment preventing device to an inoperative state such that the operating handle can be detached from the hoist.

2. A storage construction as claimed in claim 1, wherein the detachment preventing device includes first and second claw members pivotal about first and second shafts, respectively;

wherein a mating contact portion is formed integrally with the first claw member such that the contact member is brought into contact with the mating contact portion;

wherein by pivoting the second claw member in response to pivotal movement of the first claw member in a direction opposite to that of the pivotal movement of the first claw member, the first and second claw members are opened and closed such that the operating handle can and cannot be detached from the hoist, respectively.

3. A storage construction as claimed in claim 1, further comprising:

a hook which is operatively associated with the detachment preventing device so as to be detachably brought into engagement with the hanger;

wherein when the spare tire has been lifted to the hoisting completion position by the hoist, the hook is brought into engagement with the hanger so as to prevent detachment of the spare tire from the tire storage portion.

4. A storage construction as claimed in claim 3, further comprising:

an operating lever which is provided at the insertion portion of the hoist; and a locking member which is detachably brought into engagement with the hook so as to lock engagement of the hook with the hanger such that disengagement of the hook from the hanger is prevented;

wherein the locking member is disengaged from the hook in response to operation of the operating lever so as to unlock engagement of the hook with the hanger such that the hook can be detached from the hanger.

5. A storage construction as claimed in claim 4, wherein the hook is urged at all times in a direction away from the hanger and the locking member is urged at all times in a direction towards the hook;

wherein the operating lever covers the insertion portion of the hoist in an inoperative state of the operating lever.

6. A storage construction as claimed in claim 1, which is provided between front wheels and rear wheels of the motor vehicle.

7. A storage construction as claimed in claim 1, wherein the hanger includes a lower plate and a rectangular plate provided above the lower plate through a coiled spring.

8. A storage construction as claimed in claim 4, wherein the operating lever covers the insertion portion of the hoist in an inoperative state of the operating lever.

* * * * *